United States Patent [19]

Blore et al.

[11] 4,288,279

[45] Sep. 8, 1981

[54] APPARATUS FOR PRODUCING BAGS OF PLASTICS MATERIAL

[75] Inventors: Peter D. Blore, Beeston; David S. Wheatley, Ilkeston, both of England

[73] Assignee: Metal Closures Venue Packaging Limited, Ilkeston, England

[21] Appl. No.: 56,891

[22] Filed: Jul. 12, 1979

[30] Foreign Application Priority Data

Jan. 12, 1979 [GB] United Kingdom ................. 1255/79

[51] Int. Cl.³ ............................................. B32B 31/04

[52] U.S. Cl. .................................... 156/498; 156/499; 156/515; 156/522; 156/538; 156/540; 156/547

[58] Field of Search ............... 156/251, 498, 499, 500, 156/501, 515, 538, 540, 543, 547, 522, 516; 53/383; 93/8 WA

[56] References Cited

U.S. PATENT DOCUMENTS

| | | | |
|---|---|---|---|
| 1,904,874 | 4/1933 | Meader | 156/547 |
| 2,625,287 | 1/1953 | Holt et al. | 156/522 |
| 3,518,152 | 6/1970 | Storti | 156/540 |
| 3,560,310 | 2/1971 | Bolton | 156/547 |
| 3,746,596 | 7/1973 | Van Hart | 156/515 |

FOREIGN PATENT DOCUMENTS

| | | | |
|---|---|---|---|
| 636730 | 2/1962 | Canada | 156/547 |
| 1429364 | 3/1976 | United Kingdom | 156/540 |

*Primary Examiner*—Caleb Weston
*Attorney, Agent, or Firm*—Drummond and Nelson

[57] ABSTRACT

Apparatus for producing a bag of plastics material having an opening closable by a flap which is provided with a band of adhesive for securing the flap to the bag after closing of the opening, the band of adhesive being covered by a releasable strip of plastics material. The apparatus includes a reel holder for rotatably supporting a reel of the releasable strip, a first guide for feeding the strip in succession passed an adhesive applicator for applying a band of adhesive to one side of the strip, a second guide for guiding a continuous length of folded plastics material for forming the bag to heat a severing mechanism which operates to sever separate bags from the continuous length of material and also fuse together the edges of each separated bag, a pressure mechanism situated to apply the strip to the continuous length of material so that the strip is secured by the band of adhesive to the continuous length of material before it is fed to the severing mechanism, and a reel holder including a table rotatable about a vertical axis and arranged to support the reel horizontally. A brake mechanism is provided for restraining the rotation of the table so that the strip is tensioned as it is pulled off the reel.

25 Claims, 7 Drawing Figures

APPARATUS FOR PRODUCING BAGS OF PLASTICS MATERIAL

The present application relates to apparatus for producing bags of plastics material of the type which have an opening closable by a flap which may be held in a closed position by a band of adhesive.

According to the present invention there is provided apparatus for producing bags of plastics material having an opening closable by a flap and a band of adhesive for securing the flap after closing of the opening, the band of adhesive being covered by a releasable strip of plastics material, the apparatus including a reel holder for rotatably supporting a reel of the releasable strip, guide means for feeding the strip in succession passed an adhesive application for applying a band of adhesive to one side of the strip, and cooling means for cooling the strip and band of adhesive, further guide means for guiding a continuous length of folded plastics material for forming the bags to heat severing means which operate to sever separate bags from said continuous length and also fuse together the edges of each separated bag, and pressure means arranged to apply the strip to said continuous length so that the strip is secured by the band of adhesive to said continuous length before it is fed to the severing means, including a table rotatable about a vertical axis and arranged to support the reel horizontally, brake means being provided for restraining rotation of the table so as to tension the strip as it is pulled off the reel.

Reference is now made to the accompanying drawings, in which.

Figure 1:
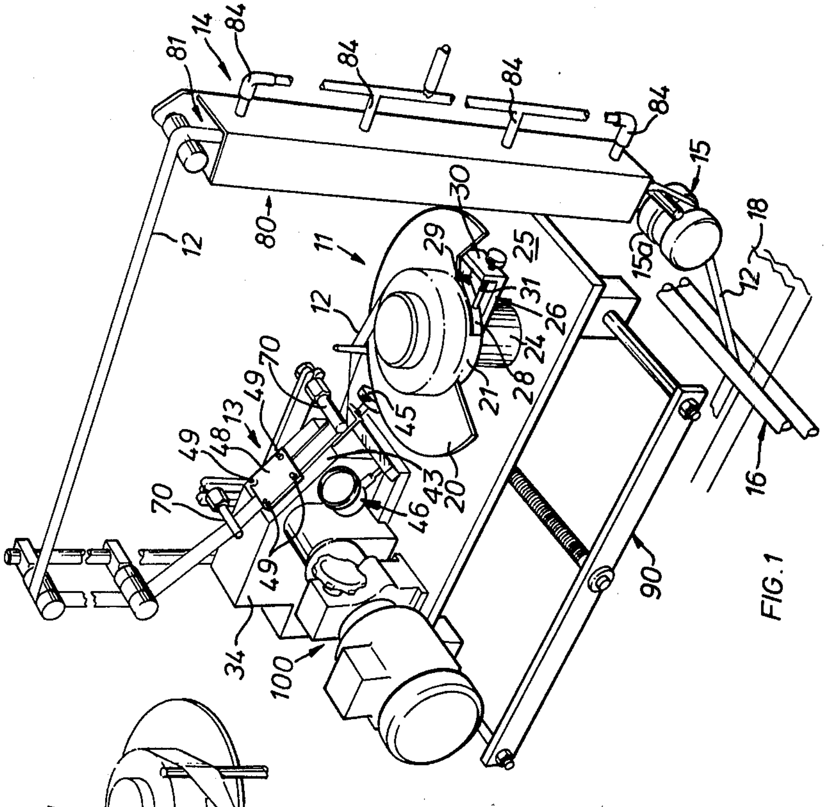
FIG. 1 is a perspective view of a first embodiment according to the present invention.

The apparatus illustrated in FIG. 1 includes a reel holder 11 from which a strip 12 is fed via an adhesive applicator 13, a drying chamber 14 and a cooling guide 15 to be pressed onto a continuous strip of folded film 18 by being passed through the nip between a pair of rollers 16. The surface of strip 12 is treated, for instance by having a silicone coating, so that the strip 12 may be removed from film 18 to leave a band of adhesive on the film 18.

Figure 7:
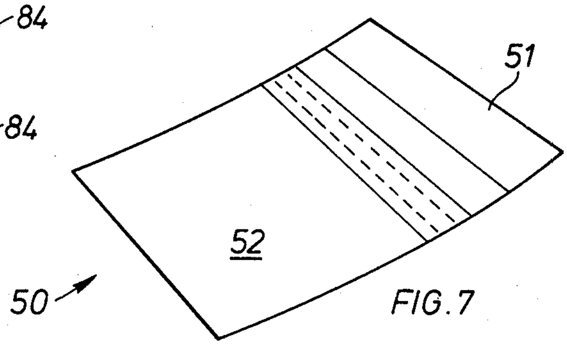
FIG. 7 is a schematic view of a bag formed on apparatus according to the present invention.

The strip of film 18 together with the attached strip 12 is then presented to a heated severer (not shown) which severs the strip transversely and also fuses the edges of the folded strip to one another to form separate bags 50 as shown in FIG. 7. The strip 12 is formed of a meltable material which will not fuse with the material of the strip of film 18, for instance the strip of film may be formed from a low density polyethylene and the strip 12 may be formed from a high density polyethylene.

The strip of film 18 is driven through the rollers 16 by drive rollers (not shown) and accordingly the strip 12 on contacting the film 18 is pulled through the apparatus.

The reel holder 11 includes a table 20 which is supported by and secured to a rotatable boss 21 which is rotatably mounted on a shaft 24 carried by a platform 25. The rate at which the table 20 may rotate is controlled by a brake 26 acting on the boss 21 so that the tension in the strip 12 may be adjusted by adjusting the effectiveness of the brake 26. The brake 26 includes a brake pad 28, formed of asbestos, which is mounted on one end of a spring metal strip 29.

The opposite end of the metal strip 29 is mounted on a support 30 attached to shaft 24. A screw threaded shaft 31 is provided which engages the metal strip 29, so that on rotation of the shaft 31, the brake pad 28 may be moved toward or away from the boss 21.

A reel of strip 12 is supported on the table 20 and is fed through the apparatus as shown. It has been found that using a table 20 which is rotatable about a vertical axis is particularly advantageous since it supports the reel across its entire width thereby preventing the reel collapsing and it also enables several reels to be stacked on top of one another on the table 20.

The adhesive applicator 13 includes a housing 34 in which an adhesive reservoir 35 is contained. The adhesive used is preferably of the type which is dissolved in a solvent which on removal leaves the adhesive alone. The adhesive is preferably of the tacky type which on removal of strip 12 enables the flap 51 of bag 50 to be repeatedly secured to side 52 of the bag. A suitable adhesive is X1037 as supplied by Berger Adhesives Limited.

Figure 5:
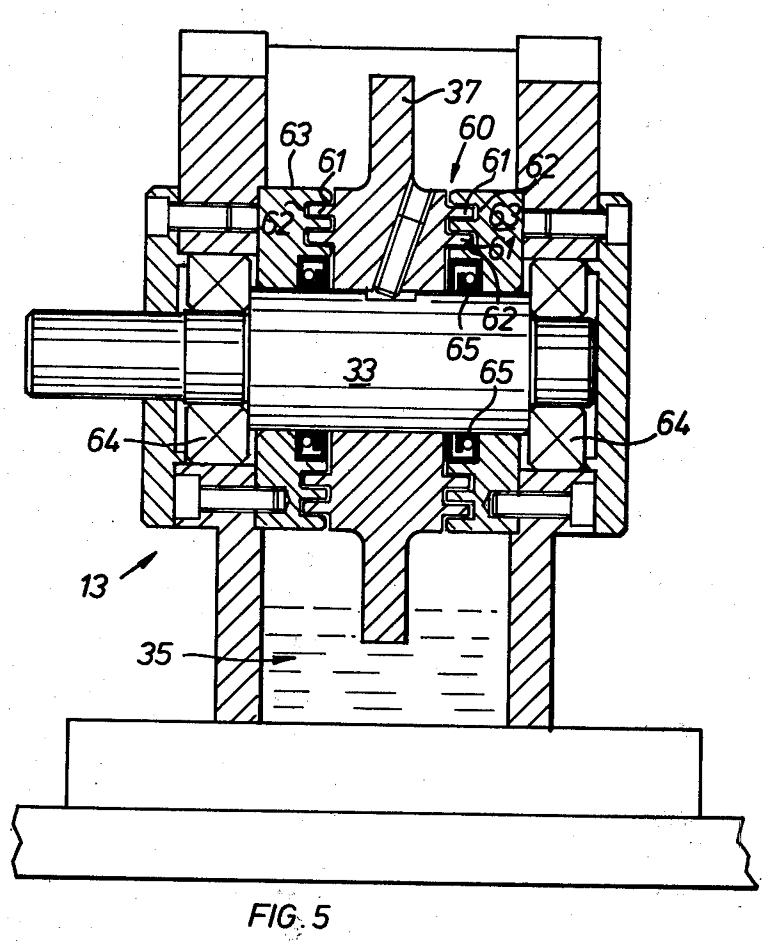
FIG. 5 is an enlarged sectional end view of the adhesive pick-up wheel of the adhesive applicator.

Dipping into the reservoir 35 is an adhesive pick-up wheel 37 whose peripheral surface projects through a window 38 formed in an inclined wall 39 of the housing 34. The wheel 37 as shown in FIG. 5 is mounted on a shaft 33 which is rotatably driven may be adjusted by a speed control 100 (FIG. 1) so as to vary the amount of adhesive on the wheel. Preferably, the speed of the motor is adjusted so that the peripheral speed of the wheel is substantially equal to the rate of travel of the strip 12.

An internal scraper 40 is provided which co-operates with the periphery of the wheel 37 to coarsely regulate the amount of adhesive being picked up by the wheel 37.

Finer adjustment of the amount of adhesive being presented to strip 12 is controlled by a scraper blade 42 which is slidably mounted in a guide 43 secured to the outer side of wall 39. The scraper blade 42 has a terminal end **42*a* which is spaced from the periphery of wheel 37 to determine the thickness of the layer of adhesive to be transferred to the strip 12**.

The spacing between the wheel and the scraper blade is accurately adjusted by means of a nut 45 co-operating with the scraper blade. A vernier 46 preferably provided to give a visual indication of the spacing between the wheel and scraper blade.

The strip 12 is fed across the window 38 to contact the periphery of wheel 37 and is urged into contact therewith by a pressure plate 48. A resilient pad **48*a* may be provided on the underside of the plate 48 to contact the strip 12. The plate 48 is slidably supported on four threaded shafts 49** and it has been found that sufficient pressure is applied when using a metal plate by relying on gravity bias.

However, if desired additional pressure may be applied by locating nuts on the threaded shafts and using these to urge the plate 48 towards the window 38. Accordingly, adhesive carried on the periphery of wheel 37 is transferred onto the strip in the form of a band. The width of the band is the same as the width of the wheel. This width is chosen to be less than the width of the strip 12.

As shown in FIG. 5 the wheel 37 is provided with a hub portion 60 which has a plurality of axially extending ribs 61 which are concentric to one another and also are received in complimentary grooves 62 formed in bearing members 63. The complimentary ribs 61 and grooves 62 serve to restrain adhesive from reaching shaft 33. Any adhesive reaching shaft 33 is prevented from reaching bearings 64 by seals 65.

A pair of guides 70 are provided for guiding the strip 12 passed the window 38. The drying chamber 14 includes an elongate housing 80 having open upper and lower ends 81, 82 respectively.

The strip 12, now having a band of adhesive, passes in a downwards direction through chamber 14. A series of nozzles 84 are arranged in line to project hot air onto the strip as it passes through the chamber so that the solvent is removed by the time the strip emerges from the bottom of the chamber. In order to guide the strip 12 as it passes through the chamber, the nozzles 84 are closely spaced from the rear wall 86 of the chamber to thereby provide a restricted passage for the strip and prevent it from twisting on passing through the chamber.

The rear wall 86 is preferably provided with a surface having a low co-efficient of friction, for example a layer of polytetrafluoroethylene 87 may be secured to the rear wall 86.

The strip as it emerges from the drying chamber is presented to the cooling guide 15 which serves to cool the strip 12 before it is brought into contact with the film 18. This is important since if the strip 12 were secured to the film 18 whilst at an elevated temperature, on cooling it would contract and therefore create wrinkles in the film.

Figure 2:
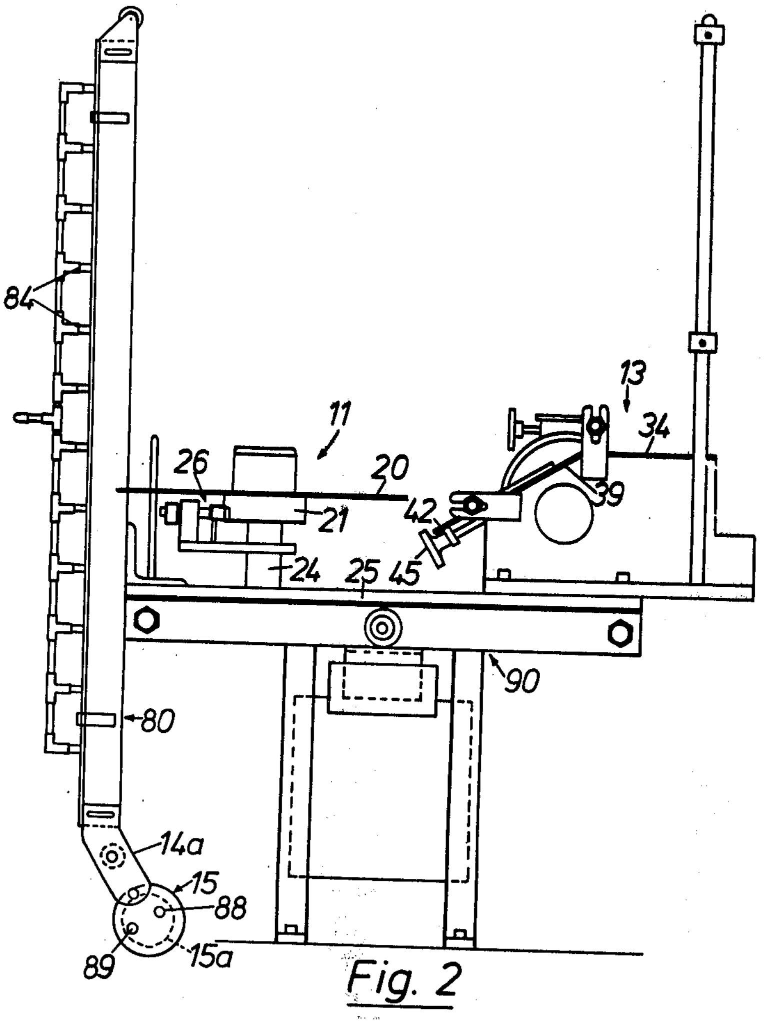
FIG. 2 is a side view of the first embodiment.
Figure 3:
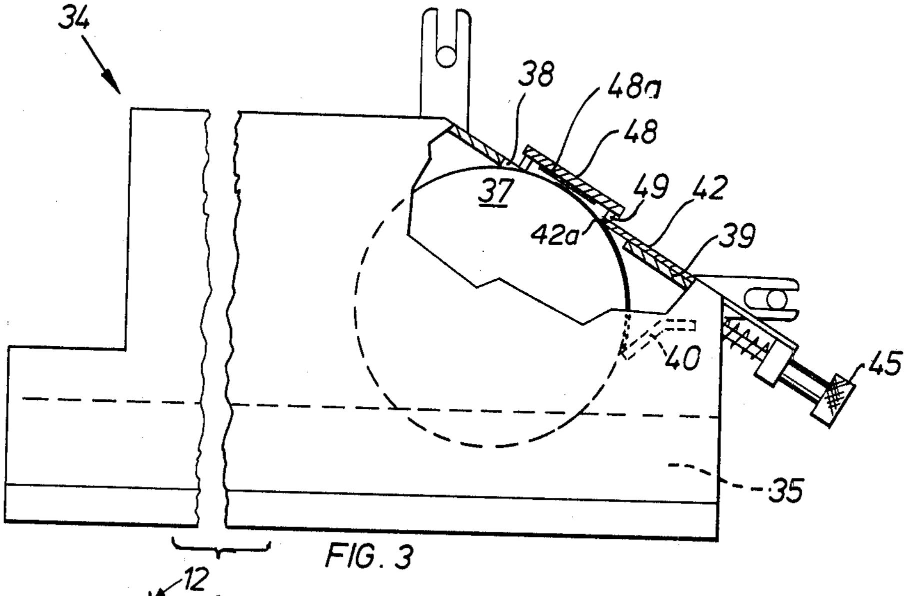
FIG. 3 is an enlarged side view of the adhesive applicator shown in FIGS. 1 and 2.
Figure 4:
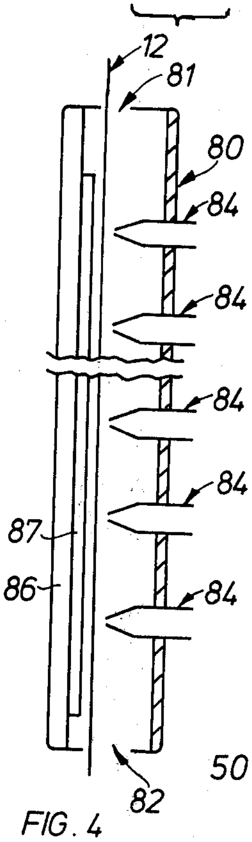
FIG. 4 is a cross-sectional view of the adhesive drying chamber shown in FIGS. 1 and 2.

The guide 15 is of cylindrical shape and is provided with a peripherally extending channel 15*a* which receives the strip 12. The interior of the guide 15 is water cooled to maintain a low temperature for cooling the strip 12. Accordingly as shown in FIG. 2 the guide 15 is provided with a water inlet 88 and a water outlet 89.

The heating chamber 14 is also mounted on platform 25 and the guide 15 is supported on struts 14*a* extending from the heating chamber. The platform 25 is movably mounted on a frame 90 so that the lateral position at which the strip 12 is fed to pressure rollers 16 may be adjusted relative to the film 18.

Figure 6:
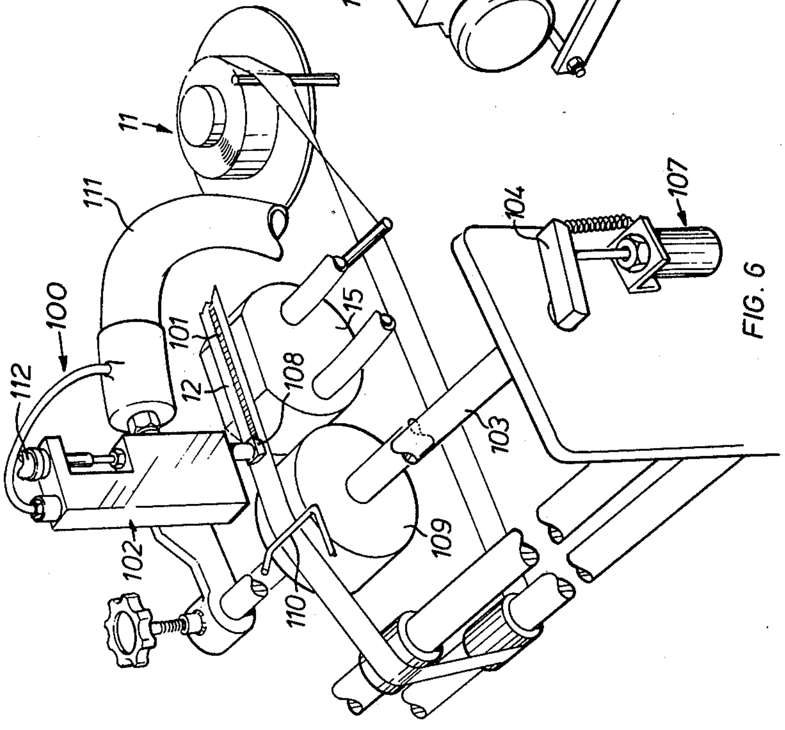
FIG. 6 is a perspective view of a second embodiment according to the present invention.

A second embodiment is illustrated in FIG. 6. The second embodiment includes a reel holder 11 similar to the one shown in FIG. 1 which supplies strip 12 to an adhesive applicator 100 which is different to the adhesive applicator shown in FIG. 1, The adhesive applicator 100 shown in FIG. 6 is primarily intended to extrude a band 101 of a hot melt adhesive, for example LT 170-3 supplied by Berger Adhesives Limited onto strip 12.

The width of the band of adhesive 101 is less than the width of the strip 12 and is located centrally of the strip.

This adhesive is sufficiently strong to cause the polyethylene of the finished bag to tear once the flap has been pressed onto the band of adhesive.

The applicator 100 includes an extruding head 102 which is fixedly mounted on a shaft 103. The shaft 103 is rotatably mounted in the frame of the apparatus and is provided with a radial arm 104 which is acted upon by a pneumatic ram 107 to cause partial rotation of the shaft 103. Accordingly, the head 102 may be moved between raised and lowered positions by actuation of ram 107. The head 102 has an extruding nozzle 108 which is located above spaced guide members 109 and 15, the strip being maintained in contact with guide member 109 by an arm 110. In operation, the head 102 is located in its lowered position so that the nozzle 108 slightly depressed the strip 12 between the guide members 109 and 15 to ensure contact between the nozzle and strip is maintained.

Molten adhesive is pumped to the head 102 from a source (not shown) via an electrically heated conduit 111. Supply of adhesive to the nozzle 108 is controlled by a valve which is actuated by a pneumatic ram 112.

After the adhesive has been applied to the strip 12, the strip passes over the water cooled guide 15 to cool the strip and solidify the adhesive. The strip and adhesive are then fed to a pair of rollers 16 in order to press the strip onto film 18 passing therethrough.

A sensor (not shown) is provided to sense when the passage of the strip 12 has stopped, the sensor being arranged to cause actuation of the ram 107 to cause the head 102 to be moved to its raised position thereby lifting the nozzle 108 out of contact with the strip 12.

It is envisaged that an adhesive applicator 100 could be incorporated into the apparatus of FIG. 1 in replacement of adhesive applicator 13 and arranged to extrude or spray a band of adhesive containing solvent onto the strip 12.

What we claim is:

1. Apparatus for producing bags of plastics material having an opening closable by a flap and a band of adhesive for securing the flap after closing of the opening, the band of adhesive being covered by a releasable strip of plastics material, the apparatus including a reel holder for rotatably supporting a reel of the releasable strip, guide means for feeding the strip in succession passed on adhesive applicator for applying a band of adhesive to one side of the strip, further guide means for guiding a continuous length of folded plastics material for forming the bags to heat severing means which operate to sever separate bags from said continuous length and also fuse together the edges of each separated bags, and pressure means arranged to apply the strip to said continuous length so that the strip is secured by the band of adhesive to said continuous length before it is fed to the severing means, a reel holder including a table rotatable about a vertical axis and arranged to support the reel horizontally, brake means being provided for restraining rotation of the table so as to tension the strip as it is pulled off the reel.

2. Apparatus according to claim 1 wherein the table is mounted on a boss and the brake means is arranged to frictionally contact the periphery of the boss, the brake means including a brake pad of frictional material carried by a resilient arm, engagement means being provided for engaging the arm to move the pad toward or away from the boss so as to vary the pressure of contact between the pad and the boss.

3. Apparatus according to claim 1 including cooling means comprising a cylindrical housing having a groove formed in its periphery for receiving the strip, the housing being fed a cooling medium for maintaining its walls at a low temperature.

4. Apparatus according to claim 2 including cooling means comprises a cylindrical housing having a groove formed in its periphery for receiving the strip, the housing being fed a cooling medium for maintaining its walls at a low temperature.

5. Apparatus according to claims 3 or 4, wherein the adhesive applicator includes a nozzle for applying adhesive onto the strip.

6. Apparatus according to claims 3 or 4, wherein the adhesive applicator comprises a housing containing a reservoir of a solvent containing the adhesive, a wheel rotatably driven to pick up adhesive containing solvent on its periphery and present it to a window in the housing wall, the strip being fed across the window so that adhesive containing solvent is transferred onto the strip.

7. Apparatus according to claim 5 wherein the nozzle is arranged to extrude a band of hot melt adhesive onto the strip.

8. Apparatus according to claim 6 further including pressure means for urging the strip into contact with the periphery of the wheel.

9. Apparatus according to claim 8 wherein said wheel is provided on both sides with a plurality of concentric axially extending ribs co-operable with complimentary bearing members so as to restrain passage of the adhesive containing solvent to the shaft on which the wheel is mounted.

10. Apparatus according to claim 9 including heating means to remove from said adhesive to leave the adhesive alone on the strip prior to reaching the cooling means.

11. Apparatus according to claim 10 wherein the heating means comprises an elongate housing containing a plurality of nozzles facing and spaced from a wall of the housing and being spaced from one another along the wall to define a guideway for passage of the strip through the housing, the nozzles being arranged to direct heated air across the strip.

12. Apparatus according to claim 11 wherein the wall of the housing is provided with a surface having a low coefficient of friction.

13. Apparatus according to claim 6 wherein said wheel is provided on both sides with a plurality of concentric axially extending ribs co-operable with complimentary bearing members so as to restrain passage of the adhesive containing solvent to the shaft on which the wheel is mounted.

14. Apparatus according to claim 13 including heating means to remove from said adhesive to leave the adhesive alone on the strip prior to reaching the cooling means.

15. Apparatus according to claim 14 wherein the heating means comprises an elongate housing containing a plurality of nozzles facing and spaced from a wall of the housing and being spaced from one another along the wall to define a guideway for passage of the strip through the housing, the nozzles being arranged to direct heated air across the strip.

16. Apparatus according to claim 15 wherein the wall of the housing is provided with a surface having a low coefficient of friction.

17. Apparatus according to claim 8 including heating means to remove from said adhesive to leave the adhesive alone on the strip prior to reaching the cooling means.

18. Apparatus according to claim 17 wherein the heating means comprises an elongate housing containing a plurality of nozzles facing and spaced from a wall of the housing and being spaced from one another along the wall to define a guideway for passage of the strip through the housing, the nozzles being arranged to direct heated air across the strip.

19. Apparatus according to claim 18 wherein the wall of the housing is provided with a surface having a low coefficient of friction.

20. Apparatus according to claim 6 including heating means to remove from said adhesive to leave the adhesive alone on the strip prior to reaching the cooling means.

21. Apparatus according to claim 20 wherein the heating means comprises an elongate housing containing a plurality of nozzles facing and spaced from a wall of the housing and being spaced from one another along the wall to define a guideway for passage of the strip through the housing, the nozzles being arranged to direct heated air across the strip.

22. Apparatus according to claim 21 wherein the wall of the housing is provided with a surface having a low coefficient of friction.

23. Apparatus according to claim 5 including heating means to remove from said adhesive to leave the adhesive alone on the strip prior to reaching the cooling means.

24. Apparatus according to claim 23 wherein the heating means comprises an elongate housing containing a plurality of nozzles facing and spaced from a wall of the housing and being spaced from one another along the wall to define a guideway for passage of the strip through the housing, the nozzles being arranged to direct heated air across the strip.

25. Apparatus according to claim 24 wherein the wall of the housing is provided with a surface having a low coefficient of friction.

* * * * *

UNITED STATES PATENT AND TRADEMARK OFFICE

CERTIFICATE OF CORRECTION

PATENT NO. : 4,288,279

DATED : September 8, 1981

INVENTOR(S) : Peter D. Blore, David S. Wheatley

It is certified that error appears in the above-identified patent and that said Letters Patent are hereby corrected as shown below:

In Claims 10, 14, 17, 20 & 23 insert the words -- said solvent -- after the words "including heat means to remove.

Signed and Sealed this

*Fourth* Day of *May 1982*

[SEAL]

*Attest:*

GERALD J. MOSSINGHOFF

*Attesting Officer* *Commissioner of Patents and Trademarks*